(12) United States Patent
Yu

(10) Patent No.: US 10,061,076 B2
(45) Date of Patent: Aug. 28, 2018

(54) LIQUID CRYSTAL DISPLAY AND BACKLIGHT MODULE OF THE SAME

(71) Applicant: Shenzhen China Star Optoelectronics Technology Co., Ltd., Shenzhen, Guangdong (CN)

(72) Inventor: Gang Yu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 255 days.

(21) Appl. No.: 14/909,802

(22) PCT Filed: Jan. 18, 2016

(86) PCT No.: PCT/CN2016/071220
§ 371 (c)(1),
(2) Date: Feb. 3, 2016

(87) PCT Pub. No.: WO2017/107271
PCT Pub. Date: Jun. 29, 2017

(65) Prior Publication Data
US 2017/0322365 A1  Nov. 9, 2017

(30) Foreign Application Priority Data
Dec. 23, 2015  (CN) .......................... 2015 1 0976081

(51) Int. Cl.
*G02F 1/1333* (2006.01)
*F21V 8/00* (2006.01)

(52) U.S. Cl.
CPC ......... *G02B 6/0088* (2013.01); *G02F 1/1333* (2013.01); *G02F 2001/133314* (2013.01);
(Continued)

(58) Field of Classification Search
CPC ............ G02B 6/0088; G02F 1/133608; G02F 2001/133314; G02F 2001/133322; G02F 2201/465
See application file for complete search history.

(56) References Cited

U.S. PATENT DOCUMENTS 8,905,617 B2 *  12/2014  Jeong ................ G02F 1/133308
362/632
2013/0215356 A1 *  8/2013  Yu ......................... G02B 6/0088
349/58
(Continued)

FOREIGN PATENT DOCUMENTS

CN           1945397 A       4/2007
CN        201724152 U        1/2011
(Continued)

*Primary Examiner* — Nathanael R Briggs
(74) *Attorney, Agent, or Firm* — Andrew C. Cheng

(57) ABSTRACT

The present invention discloses a backlight module including: a back frame comprising a bottom plate having a first insertion hole; a light guide plate carried on the bottom plate; an optical film disposed on the light guide plate and having a second insertion hole; a fixing part comprising an engagement portion and a first insertion portion and a second insertion portion which are respectively disposed at two sides of the engagement portion; wherein, the engagement portion is engaged in a side surface of the light guide plate, the first insertion portion is inserted in the first insertion hole, and the second insertion portion is inserted in the second insertion hole. A liquid crystal display having the backlight module is also disclosed. Through the fixing part to fix and combine the back fame, the light guide plate and the optical film together, the problem of insufficient installation space is solved.

7 Claims, 3 Drawing Sheets

(52) U.S. Cl.
CPC ............ *G02F 2001/133322* (2013.01); *G02F 2201/465* (2013.01)

(56) References Cited

U.S. PATENT DOCUMENTS

2014/0111735 A1* 4/2014 Cho .................. G02F 1/133608
  349/58
2015/0219837 A1    8/2015 Horiguchi
2016/0363719 A1* 12/2016 Ma ....................... G02B 6/0088

FOREIGN PATENT DOCUMENTS

| CN | 102661553 A | 9/2012 |
| CN | 102691929 A | 9/2012 |
| CN | 102829443 A | 12/2012 |
| CN | 104061498 A | 9/2014 |

* cited by examiner

LIQUID CRYSTAL DISPLAY AND BACKLIGHT MODULE OF THE SAME

BACKGROUND OF THE INVENTION

1. Field of the Invention

The present invention relates to a liquid crystal display technology field, and more particularly to a liquid crystal display and a backlight module of the same.

2. Description of Related Art

With the evolution of optical and semiconductor technology, Flat Panel Display is developed rapidly. In many kinds of flat display panels, Liquid Crystal Display (LCD) has become a mainstream of the market because of superior characteristics of high space utilization efficiency, low power consumption, no radiation and low electromagnetic interference, and so on.

Ultra-thin design is a development trend of the liquid crystal display. Of course, when the liquid crystal display realizes the ultra-thin design, because of the limitation of the thickness of the liquid crystal display and the outward appearance, redesigning for the position of the elements in the liquid crystal display to perform an optimum design is required to solve the problem of insufficient space.

SUMMARY OF THE INVENTION

In order to solve the problem existed in the conventional art, the purpose of the present disclosure is to provide a backlight module, comprising: a back frame comprising a bottom plate having a first insertion hole; a light guide plate carried on the bottom plate; an optical film disposed on the light guide plate and having a second insertion hole; a fixing part comprising an engagement portion and a first insertion portion and a second insertion portion which are respectively disposed at two sides of the engagement portion; wherein, the engagement portion is engaged in a side surface of the light guide plate, the first insertion portion is inserted in the first insertion hole, and the second insertion portion is inserted in the second insertion hole.

Furthermore, the engagement portion comprises: a first plate, and a second plate and a third plate which are formed by extending from two opposite terminals of the first plate toward the side surfaces of the light guide plate.

Furthermore, the second plate and the third plate are disposed in parallel and are disposed perpendicularly to the first plate.

Furthermore, when the engagement portion is engaged with the side surface of the light guide plate, the first plate is attached to and fit with the side surface of the light guide plate, the second plate is attached to and fit with the top surface of the light guide plate, and the third plate is attached to and fit with the bottom surface of the light guide plate.

Furthermore, a free end of the second plate forms the first insertion portion by extending along a direction away from the top surface of the light guide plate.

Furthermore, the first insertion portion is in parallel with the first plate.

Furthermore, a free end of the third plate forms the second insertion portion by extending along a direction away from the bottom surface of the light guide plate.

Furthermore, the second insertion portion is in parallel with the first plate.

Furthermore, the first insertion hole and/or the second insertion hole is a through hole or a blind hole.

Another purpose of the present disclosure is also to provide a liquid crystal display including the above backlight module.

The beneficial effects of the present disclosure, in the present disclosure, through the fixing part to fix and combine the back fame, the light guide plate and the optical film together, the problem of insufficient installation space is solved.

BRIEF DESCRIPTION OF THE DRAWINGS

Through following to combine figures to describe in detail, the above, the other purposes, the features and benefits of the exemplary embodiment of the present disclosure will become clearer, in the figures.

DETAILED DESCRIPTION OF THE PREFERRED EMBODIMENT

The following content combines with the drawings and the embodiment for describing the present invention in detail. However, many other forms can be used to implement the present invention. Besides, the present invention should not be interpreted to be limit in the specific embodiment described here. On the contrary, the embodiments provided here are used for explaining the operation principle and practical application such that person skilled in the art can under various embodiments of the present invention and various modification suitable for specific applications.

In the figures, in order to illustrate the devices clearly, thickness of the layers and regions are enlarged. A same numeral in the entire specification and figures represents a same device.

It should be noted that, herein, relational terms such as first and second, and the like are only used to distinguish one entity or operation from another entity or operation. It is not required or implied that these entities or operations exist any such relationship or order between them. The terms are only used to distinguish one element from another element.

Figure 1:
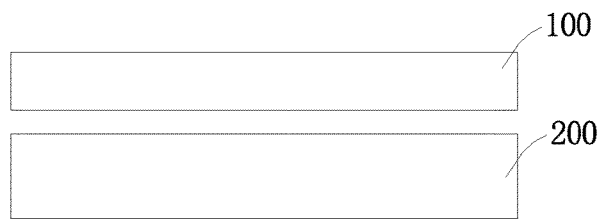
FIG. 1 is a schematic structure diagram of a liquid crystal display according to an embodiment of the present disclosure.

FIG. 1 is a schematic structure diagram of a liquid crystal display according to an embodiment of the present disclosure.

According to FIG. 1, a liquid crystal display device of the embodiment of the present disclosure includes a liquid crystal panel 100 and a backlight module 200 which are disposed oppositely. Wherein, the backlight module 200 provides an even surface light to the liquid crystal panel 100 such that the liquid crystal panel 100 can display an image.

Because the main points of the present disclosure aims to the backlight module 200 so that in order to avoid repeating, a specific structure of a liquid crystal panel 100 is not described in detail any more, person skilled in the art can refer to a specific structure of a public liquid crystal panel in the conventional art.

Figure 2:
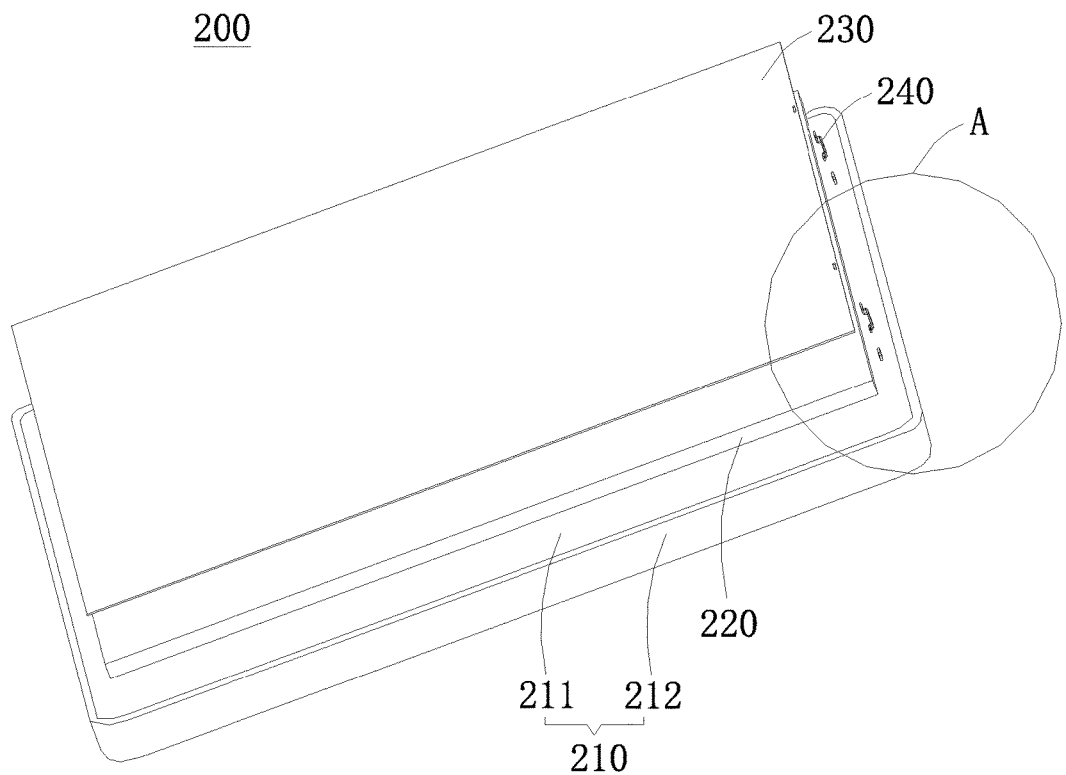
FIG. 2 is an exploded perspective view of a backlight module according to an embodiment of the present disclosure.
Figure 3:
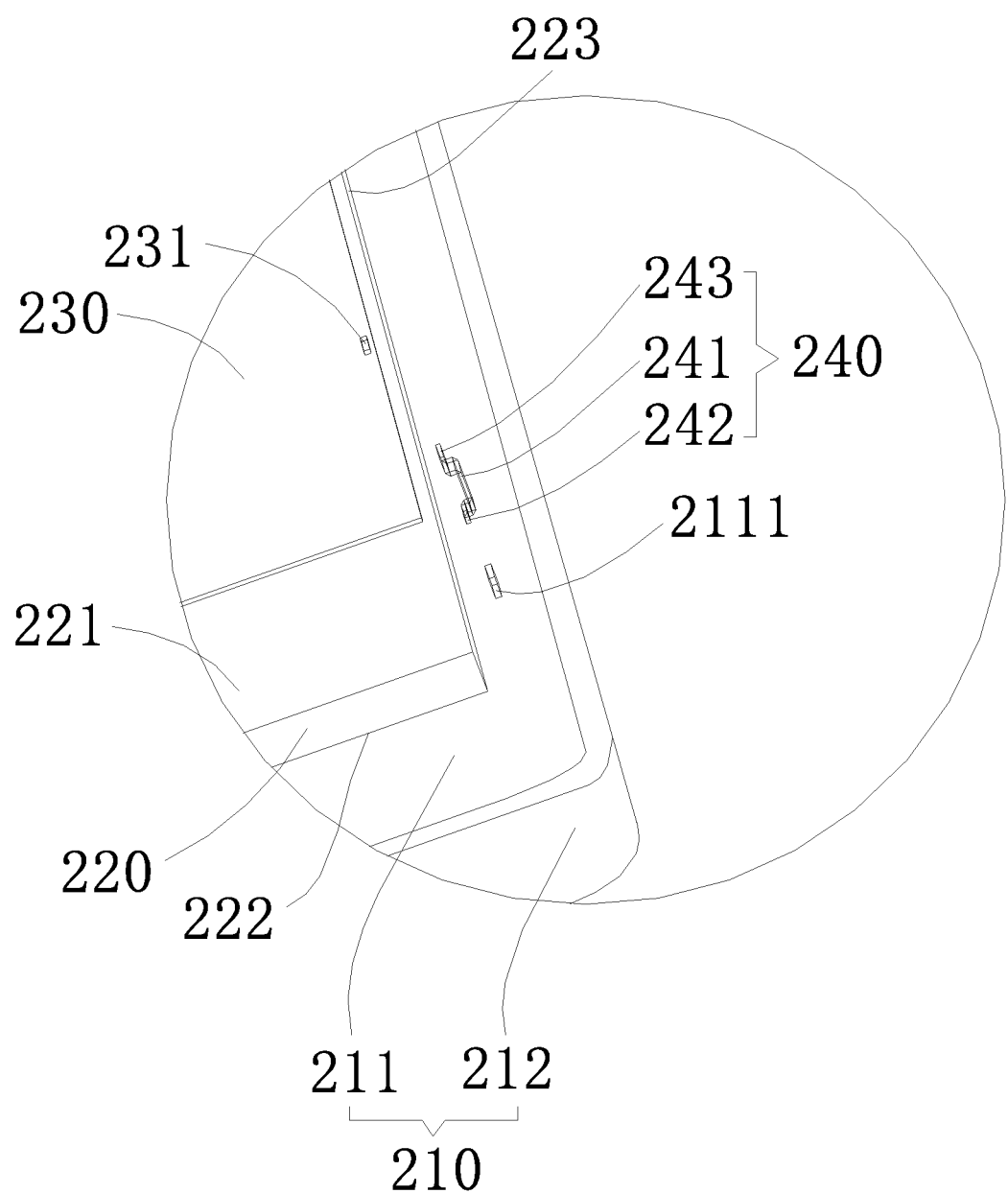
FIG. 3 is an enlarged diagram of region A in FIG. 2.

The following content will describe the backlight module 200 in detail according to the embodiment of the present disclosure. FIG. 2 is an exploded perspective view of a backlight module according to an embodiment of the present disclosure. FIG. 3 is an enlarged diagram of region A in FIG. 2.

With reference to FIG. 2 and FIG. 3, the backlight module 200 according to the embodiment of the present disclosure includes: a back frame 210, a light guide plate 220, an optical film 230 and a fixing part 240. It can be understood that the backlight module 200 can also include a light source, a plastic frame and other necessary elements. Because the main point of the present disclosure aims to the fixing part 240 of the backlight module 200, the above elements are omitted selectively. The person skilled in the art can refer to the related conventional art.

The back frame 210 includes: a bottom plate 211 and four side plates 212 respectively extended from four side terminals of the bottom plate 211. In the present embodiment, preferably, the four side plates 212 are all located at a same side of the bottom plate 211, and each side plate 212 is disposed perpendicularly to the bottom plate 211. A first insertion hole 2111 is formed on the bottom plate 211. In the present embodiment, preferably the first insertion hole 2111 is a blind hole. However, the present disclosure is not limited. For example, the first insertion hole 2111 can also be a through hole. Besides, the number of the first insertion hole 2111 is two, however, the present disclosure is not limited.

The light guide plate 220 is a plate shape, including a top surface 221 and a bottom surface 222 which are disposed oppositely, and a side surface 223 connecting the top surface 221 and the bottom surface 222. The light guide plate 220 is carried on the bottom plate 211 of the back frame 210. In the present disclosure, the light guide plate 220 is made of a transparent material such as PMMA, etc.

The optical film 230 is disposed on the light guide plate 220, and the optical film 230 is provided with a second insertion hole 231. In the present embodiment, preferably, the second insertion hole 231 is a through hole, however, the present disclosure is not limited. For example the second insertion hole 231 is a blind hole. Besides, the number of the second insertion hole 231 is two, however, the present disclosure is not limited. Specifically, the second insertion hole 231 and the first insertion hole 2111 are corresponding one by one.

Besides, the optical film 230 can be a brightness enhancement film or a diffusion film, etc. The optical film 230 can improve the optical quality of lights emitted from the top surface 221 of the light guide plate 220. In the present embodiment, the number of the optical film 230 is not specifically limited. According to an actual requirement, different kinds and different number of the optical film 230 can be provided.

The fixing part 240 includes an engagement portion 241 and a first insertion portion 242 and a second insertion portion 243 respectively disposed at two sides of the engagement portion 241. Wherein, the engagement portion 241 is engaged in the side surface 223 of the light guide plate 220. The first insertion portion 242 is inserted in the first insertion hole 2111, and the second insertion portion 243 is inserted in the second insertion hole 231. Accordingly, through the fixing part 240 to realize the fixing and combination of the back frame 210, the light guide plate 220 and the optical film 230 in order to solve the problem of insufficient installation space.

Figure 4:
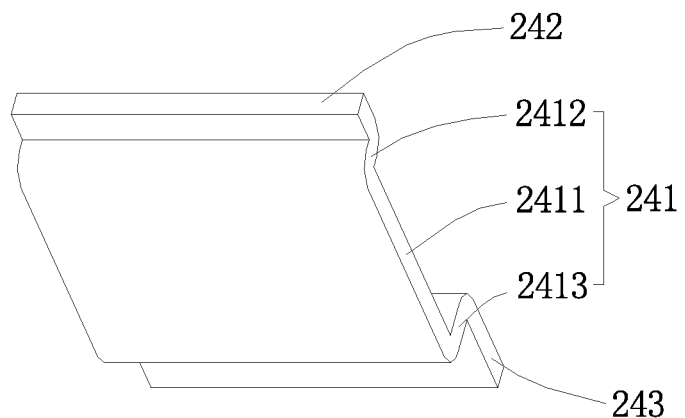
FIG. 4 is a perspective view of a fixing part according to an embodiment of the present disclosure.
Figure 5:
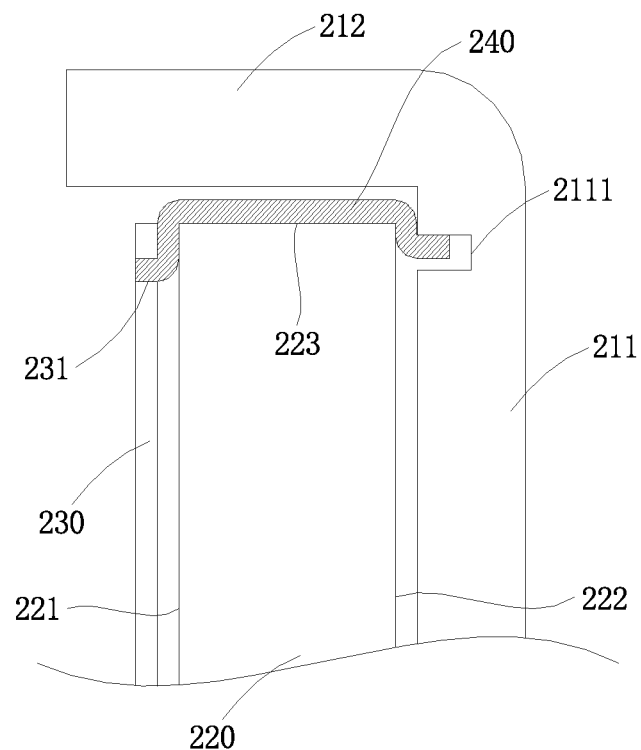
FIG. 5 is a partial cross-sectional view of a backlight module according to an embodiment of the present disclosure.

FIG. 4 is a perspective view of a fixing part according to an embodiment of the present disclosure. FIG. 5 is a partial cross-sectional view of a backlight module according to an embodiment of the present disclosure.

With reference to FIG. 4 and FIG. 5, the engagement portion 241 according to the embodiment of the present invention includes: a first plate 2411, and a second plate 2412 and a third plate 2413 which are formed by extending from two opposite terminals of the first plate 2411 toward the side surface 223 of the light guide plate 220.

In the present embodiment, preferably, the second plate 2412 and the third plate 2413 are disposed in parallel and are disposed perpendicularly to the first plate 2411. However, the present invention is not limited.

Accordingly, when the engagement portion 241 is engaged with the side surface 223 of the light guide plate 220, the first plate 2411 is attached to and fit with the side surface 223 of the light guide plate 220. The second plate 2412 is attached to and fit with the top surface 221 of the light guide plate 220, and the third plate 2413 is attached to and fit with the bottom surface 222 of the light guide plate 220. It can be understood that in another embodiment, the second plate 2412 is attached to and fit with the bottom surface 222 of the light guide plate 220, and the third plate 2413 is attached to and fit with the top surface 221 of the light guide plate 220.

Furthermore, a free end of the second plate 2412 (that is, a side terminal of the second plate 2412 not connected with the first plate 2411) forms the first insertion portion 242 by extending along a direction away from the top surface 221 of the light guide plate 220. In the present embodiment, the first insertion portion 242 and the first plate 2411 are disposed in parallel. However, the present disclosure is not limited.

Furthermore, a free end of the third plate 2413 (that is, a side terminal of the third plate 2413 not connected with the first plate 2411) forms the second insertion portion 243 by extending along a direction away from the bottom surface 222 of the light guide plate 220. In the present embodiment, the second insertion portion 243 and the first plate 2411 are disposed in parallel. However, the present disclosure is not limited.

In summary, according to the embodiment of the present disclosure, through the fixing part to fix and combine the back fame, the light guide plate and the optical film together, the problem of insufficient installation space is solved.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:
1. A backlight module, comprising:
a back frame comprising a bottom plate having a first insertion hole, and a side plate extended from a side terminals of the bottom plate;
a light guide plate carried on the bottom plate;
an optical film disposed on the light guide plate and having a second insertion hole; and a fixing part comprising an engagement portion and a first insertion portion and a second insertion portion which are respectively disposed at two sides of the engagement portion;

wherein, the engagement portion is engaged in a side surface of the light guide plate, the first insertion portion is inserted in the first insertion hole, and the second insertion portion is inserted in the second insertion hole;

wherein the fixing part is disposed between the side surface of the light guide plate and the side plate of the back frame;

wherein the engagement portion comprises a first plate, and a second plate and a third plate which are formed by extending from two opposite terminals of the first plate toward the side surfaces of the light guide plate;

wherein the second plate and the third plate are disposed in parallel and are disposed perpendicularly to the first plate;

wherein the first plate is attached to and fit with the side surface of the light guide plate, the second plate is attached to and fit with the top surface of the light guide plate, and the third plate is attached to and fit with the bottom surface of the light guide plate;

wherein the optical film disposed on the second plate, and a first gap is existed between the optical film and the top surface of the light guide plate; and wherein a second gap is existed the bottom surface of the light guide plate and the bottom plate of back frame.

2. The backlight module according to claim 1, wherein, a free end of the second plate forms the first insertion portion by extending along a direction away from the top surface of the light guide plate.

3. The backlight module according to claim 2, wherein, the first insertion portion is in parallel with the first plate.

4. The backlight module according to claim 2, wherein, a free end of the third plate forms the second insertion portion by extending along a direction away from the bottom surface of the light guide plate.

5. The backlight module according to claim 4, wherein, the second insertion portion is in parallel with the first plate.

6. The backlight module according to claim 4, wherein, at least one of the first insertion hole and the second insertion hole is a blind hole.

7. A liquid crystal display including a liquid crystal panel and a backlight module which are disposed oppositely, wherein the backlight module comprises:

a back frame comprising a bottom plate having a first insertion hole, and a side plate extended from a side terminals of the bottom plate;

a light guide plate carried on the bottom plate;

an optical film disposed on the light guide plate and having a second insertion hole;

a fixing part comprising an engagement portion and a first insertion portion and a second insertion portion which are respectively disposed at two sides of the engagement portion;

wherein, the engagement portion is engaged in a side surface of the light guide plate, the first insertion portion is inserted in the first insertion hole, and the second insertion portion is inserted in the second insertion hole wherein the fixing part is disposed between the side surface of the light guide plate and the side plate of the back frame;

wherein the engagement portion comprises a first plate, and a second plate and a third plate which are formed by extending from two opposite terminals of the first plate toward the side surfaces of the light guide plate;

wherein the second plate and the third plate are disposed in parallel and are disposed perpendicularly to the first plate;

wherein the first plate is attached to and fit with the side surface of the light guide plate, the second plate is attached to and fit with the top surface of the light guide plate, and the third plate is attached to and fit with the bottom surface of the light guide plate;

wherein the optical film disposed on the second plate, and a first gap is existed between the optical film and the top surface of the light guide plate; and wherein a second gap is existed the bottom surface of the light guide plate and the bottom plate of back frame.

* * * * *